(12) United States Patent
Pappas et al.

(10) Patent No.: US 6,758,165 B2
(45) Date of Patent: Jul. 6, 2004

(54) MULTIPURPOSE FLOW CONTROL DEVICE

(75) Inventors: Nicholas J. Pappas, Westport, CT (US); Craig Pirie, Greenwich, CT (US); Javier Verdura, Milford, CT (US)

(73) Assignee: Medialore, LLC, Westport, CT (US)

( * ) Notice: Subject to any disclaimer, the term of this patent is extended or adjusted under 35 U.S.C. 154(b) by 0 days.

(21) Appl. No.: 10/462,442

(22) Filed: Jun. 16, 2003

(65) Prior Publication Data

US 2003/0233986 A1 Dec. 25, 2003

Related U.S. Application Data

(63) Continuation-in-part of application No. 10/178,606, filed on Jun. 24, 2002, now Pat. No. 6,718,912.

(51) Int. Cl.[7] .............................. A01K 7/00; B67B 5/00
(52) U.S. Cl. ...................... 119/72.5; 119/72; 222/153.1
(58) Field of Search .......................... 119/72.5, 72, 475, 119/464, 456; 215/21, 252, 277; 222/153.1, 494, 511, 531, 537

(56) References Cited

U.S. PATENT DOCUMENTS

| | | | |
|---|---|---|---|
| 2,307,220 A | | 1/1943 | Hewitt |
| 2,705,955 A | | 4/1955 | Nesset et al. |
| 2,726,636 A | | 12/1955 | Frederiksen |
| 2,789,717 A | | 4/1957 | Demke |
| 3,179,300 A | * | 4/1965 | Davidson et al. ........... 222/213 |
| 3,529,575 A | | 9/1970 | Schalk |
| 3,566,844 A | | 3/1971 | Occhiodori et al. |
| 3,589,338 A | | 6/1971 | Lovitz |
| 3,752,124 A | | 8/1973 | Gabriel |
| 3,771,496 A | | 11/1973 | Atchley |
| 3,794,202 A | * | 2/1974 | Unger .......................... 215/22 |
| 3,838,664 A | | 10/1974 | Atchley |
| 4,132,225 A | | 1/1979 | Whattam |
| 4,382,520 A | * | 5/1983 | Aleff ............................. 215/21 |
| 4,458,817 A | * | 7/1984 | Guala ........................... 215/21 |
| 4,637,345 A | | 1/1987 | Hostetler |
| 4,787,337 A | | 11/1988 | Mayer |
| 5,301,634 A | | 4/1994 | Ho |
| 5,301,635 A | | 4/1994 | Rovira Badia et al. |
| 5,327,853 A | | 7/1994 | Hostetler |
| 5,363,802 A | | 11/1994 | Huff |
| 5,402,750 A | | 4/1995 | Katz |
| 5,447,118 A | | 9/1995 | Huff et al. |
| 5,653,353 A | | 8/1997 | Otto et al. |
| 5,669,329 A | | 9/1997 | Krause |
| 5,743,437 A | * | 4/1998 | Moore et al. ................ 222/147 |
| 5,816,194 A | | 10/1998 | Huff |
| 5,901,882 A | | 5/1999 | Siegel |
| 6,237,800 B1 | | 5/2001 | Barrett |
| 6,293,226 B1 | | 9/2001 | Hwang |
| 6,553,937 B1 | | 4/2003 | Cheng |
| 6,619,492 B2 | * | 9/2003 | Battegazzore ................ 215/21 |
| 2003/0079692 A1 | | 5/2003 | Steudler, Jr., et al. |

* cited by examiner

Primary Examiner—Yvonne R. Abbott
(74) Attorney, Agent, or Firm—McCarter & English, LLP

(57) ABSTRACT

A flow control mechanism is provided for regulating the flow of fluid from a container or vessel, e.g., a plastic bottle containing a fluid such as water or the like. The flow control mechanism may be advantageously employed in a variety of applications where it is desired to dispense and/or access fluids in a controlled manner, e.g., applications wherein a liquid, colloidal system, suspension or the like is to be dispensed/accessed in a controlled manner. The flow control mechanisms are particularly advantageous as animal/pet drinking aids that provide animals/pets with convenient and controlled access to fluid refreshment, e.g., when away from a home-based water bowl. An exemplary control mechanism includes a cap member, overcap and ball captured therebetween. The cap member may be secured to a fluid-containing vessel and used to regulate or control the flow of fluid therefrom.

29 Claims, 7 Drawing Sheets

MULTIPURPOSE FLOW CONTROL DEVICE

1. CROSS REFERENCE TO RELATED APPLICATIONS

The present application is a continuation-in-part application and claims the benefit of a non-provisional patent application, entitled "Pet Drinking Aid Device," that was filed on Jun. 24, 2002, and assigned Ser. No. 10/178,606, now U.S. Pat. No. 6,718,912 the entire contents of which are incorporated by referenced herein.

2. TECHNICAL FIELD.

The present disclosure relates to a device for use with a container or vessel containing a fluid, and more particularly to a device for use with a bottle to assist in dispensing such fluid in a controlled manner, e.g., to assist an animal in drinking therefrom. The present disclosure further relates to a container and/or vessel that includes an advantageous flow regulation device.

3. BACKGROUND OF THE DISCLOSURE

Fluids are routinely contained within containers and/or vessels, e.g., plastic and/or glass bottles. To gain access to the fluids contained with a container/vessel, a cap is generally removed and the fluid is poured or otherwise dispensed therefrom. Thus, for example, in the case of plastic beverage bottles, a cap is generally screw threaded onto the throat of the bottle which can be removed, as desired, when it is desired to access the contents thereof. The beverage is generally consumed directly from the bottle, by way of a straw, or by pouring the beverage into a cup or glass.

In certain circumstances, beverage/water bottles may be provided with a control mechanism that permits fluid to flow therefrom upon axial movement of an annular flange relative to a fixed central abutment member. By moving the annular flange away from the bottle, an annular fluid flow path around the central abutment member is created. Axial movement of the annular flange is generally limited by a stop mechanism, thereby ensuring that the annular flange does not become separated from the bottle/control mechanism. Once the control mechanism is in the "open" position, fluid may be dispensed from the bottle under the action of gravity by tilting or inverting the bottle in combination with squeezing and/or suction forces. Return movement of the annular flange toward the bottle may be undertaken to "close" the bottle, i.e., prevent further fluid flow therefrom.

The foregoing bottle designs are generally effective for human consumption of fluids. However, such designs are not effective for a host of other applications. Thus, for example, pet owners involved in providing their pets with recreation encounter a variety of issues. For example, dog owners encounter issues associated with satisfying a dog's thirst when dog and owner are away from the dog's water bowl, e.g., when on a walk or engaged in athletic/recreational activities. It is often inconvenient and/or impractical when not at home to bring along and set up a bowl or some other container from which a pet can drink. While naturally occurring sources of fluid refreshment are sometimes available, e.g., ponds, puddles and the like, more frequently pet owners are left to their own ingenuity in attempting to address their dog's thirst when remote from the home-based water bowl.

Efforts have been devoted in the prior art to developing devices and/or systems for providing fluid refreshment to pets. For example, significant efforts have been expended in providing fluid dispensers for caged pets, such as rabbits, guinea pigs, hamsters and the like. U.S. Pat. No. 3,529,575 to Schalk et al., U.S. Pat. No. 3,771,496 to Atchley, and U.S. Pat. No. 5,363,802 to Huff disclose drinking bottles that may be detachably mounted to a pet's cage. The fluids from the disclosed drinking bottles are introduced into the cage by way of an angled tube that fits through openings defined in the wire cage. Control and/or regulation of fluid flow into the cage is provided by a displaceable ball (Atchley '496 patent and Huff '802 patent), a valve assembly (Schalk '575 patent), or multiple balls operating in conjunction to establish a seal.

Prior art efforts have also been devoted to developing systems for use by larger pets, e.g., dogs. For example, U.S. Pat. No. 5,301,634 to Ho discloses an animal feeder designed for convenient mounting to a horizontal wire member, the feeder including a ball 60 disposed in a tubular extension 43.

A pet drinking device offering portability to pet owners is disclosed in U.S. Pat. No. 6,293,226 to Hwang. The device of the Hwang '226 patent includes a bottle having a threaded mouth and a cover that engages the threaded mouth. An unsecured gasket is positioned between the cover and the bottle. The cover includes a main body that is internally threaded to engage the mouth of the bottle, and a tube. The tube defines an outwardly threaded portion at an end thereof. An internally threaded sleeve is mounted to the outwardly threaded portion of the tube. An unsecured sealing ring is positioned between the tube and the sleeve. A ball and washer are positioned within the sleeve and a lid is tethered to the cover. A belt is also provided for mounting the Hwang drinking device to a stationary structure, e.g., a hook on a wall.

Despite the prior art efforts referenced hereinabove, a need remains for advantageous control mechanisms for regulating the flow of fluid from a container or vessel. More specifically, a need exists for a drinking aid for use with animals/pets, e.g., dogs, cats, ferrets, rodents and the like, that may be readily utilized with a container, e.g., a conventional water/beverage bottle, and that offers the animal/pet convenient and controlled access to fluid refreshment.

4. SUMMARY OF THE DISCLOSURE

The present disclosure is directed to a control mechanism for regulating the flow of fluid from a container or vessel, e.g., a plastic bottle containing a fluid such as water or the like. The disclosed control mechanism may be advantageously employed in a variety of applications where it is desired to dispense and/or access fluids in a controlled manner, e.g., applications wherein a liquid, colloidal system, suspension or the like is to be dispensed/accessed in a controlled manner. The disclosed control mechanism may be provided as an accessory item, i.e., an item that is adapted to be secured to a container/vessel/bottle. The disclosed control mechanism may also be pre-mounted to a container/vessel/bottle, e.g., in the manufacturing process. In such circumstance, the present disclosure is directed to the container/vessel/bottle in combination with such advantageous control mechanism.

In an exemplary embodiment, the present disclosure relates to an animal or pet drinking aid that provides animals/pets with convenient and controlled access to fluid refreshment, e.g., when away from a home-based water bowl. The disclosed drinking aid overcomes difficulties associated with typical water bottles that deliver uncontrolled fluid flow when fully or partially inverted. The uncontrolled fluid flow provided by such conventional water bottles often finds its way into a pet's windpipe or onto the ground, regardless of the effort and care expended in attempting to address the pet's thirst.

In an exemplary embodiment, the disclosed pet drinking aid generally includes a cap that is adapted to be detachably mounted to a fluid-containing bottle. The cap may be advantageously threaded onto a fluid-containing bottle. Alternatively, the disclosed cap may include an elastomeric sleeve that facilitates detachably mounting the cap to a bottle, thereby obviating the need for cooperative threads as between the cap and the bottle. The disclosed cap also includes an internal ball that advantageously restricts and/or moderates the flow of fluid from a bottle when positioned at various angles of inversion. The internal ball is typically restrained or captured within the cap by a circumferential flange or rim that advantageously includes an elastomeric, e.g., rubber, washer adjacent and/or in engagement therewith. The washer provides an enhanced fluid seal when a pet is not accessing fluid contained within the container. Thus, for example, the bottle may generally be inverted without fluid leakage due to sealing interaction between the ball and the elastomeric washer, and between the washer and the rim of the cap.

In a first preferred embodiment of the pet drinking aid of the present disclosure, a ball is captured within a cap and is resiliently biased toward the dispensing end of the cap, e.g., by a compression spring. The cap is adapted to be detachably mounted to a fluid-containing bottle, e.g., a conventional water bottle. Preferably, the cap is internally threaded so as to facilitate screwing the cap onto the outwardly threaded neck of the bottle. In an exemplary embodiment of the disclosed pet drinking aid, a ball for regulating fluid flow and an internal plastic spring are positioned within the cap. The plastic spring advantageously supplies a light force against the ball so as to bias the "floating" ball against a lip or flange formed at or near the dispensing end of the cap, thereby capturing the ball therewithin. The diameter of the compression spring is generally slightly less than the diameter of the ball where it contacts the ball, thereby ensuring that the spring maintains engagement with the ball, i.e., the ball is not able to pass through the center of the spring. At the opposite end, the base of the spring typically engages a ridge formed in or defined by the cap, and may be advantageously staked, glued or otherwise mounted to the cap. Alternatively, the base of spring may be positioned between and secured relative to spaced ridges formed in the cap, or positioned between and secured relative to a plurality of spaced, inwardly projecting guides and/or projections formed in the cap. In a preferred embodiment of the present disclosure, the ridge is positioned at or near the midpoint of the cap.

Once the cap is mounted to a fluid-containing bottle according to preferred embodiments of the present disclosure, and the bottle is fully or partially inverted, the motion/pressure supplied to the ball by the pet's tongue, e.g., when licking the bottle/cap, pushes the ball in slightly, i.e., against the bias of the spring positioned therebehind. The movement of the ball relative to the housing of the cap allows fluid within the bottle to flow around the ball. Thus, as the pet licks the ball, the ball assumes a slightly recessed position within the cap and simultaneously spins/rotates, thereby allowing fluid to continuously flow to the pet's mouth. When the pet's licking action ceases, the spring advantageously biases the ball back into sealing engagement with the washer positioned adjacent the rim of the cap, thereby discontinuing the flow of fluid to the pet, regardless of the orientation of the bottle.

According to further preferred embodiments of the present disclosure, small projections/guides or a continuous lip or ridge may be provided on the interior of the cap to more reliably secure the elastomeric washer in position. This structural arrangement advantageously prevents the washer from becoming dislodged and interfering with the ball's desired motion. In exemplary embodiments of the disclosed pet drinking aid, four guides/projections are provided to secure the washer in position. The length of the guides/projections is selected so as to ensure a desired level of security while simultaneously permitting facile assembly of the device. Thus, for example, the guides/projections may be fabricated such that they are about half the thickness of the washer material, and the guides/projections may be circumferentially spaced around the interior of the cap, e.g., one guide/projection located at 0 degrees, one at 90 degrees, one at 180 degrees and one at 270 degrees. Alternatively, according to a further exemplary embodiment of the present disclosure, one continuous lip or ridge may be substituted for individual, spaced guides/projections. According to such alternative embodiment, the lip may be advantageously fabricated such that its thickness is less that the thickness of the washer. The thickness of the securing structure (e.g., guides/projections or lip/ridge) is selected so as not to impede/interfere with the ball sealing against the washer.

Several forces cooperate or interact to control/moderate the flow of fluid from a bottle/cap according to a spring-biased embodiment of the present disclosure. For example, the spring bias and the fluid pressure associated with the inversion (full or partial) of the bottle generally acts against the force of the pet's tongue to determine the degree to which fluid flows from the bottle. Moreover, the speed with which the ball is rotated by the pet's tongue influences the fluid dispensing rate and/or volume. The incremental force supplied by the spring bias advantageously provides a tighter seal to the cap of the present disclosure, particularly in circumstances where the bottle is positioned upright. That is, the spring continuously provides force for the ball to contact the washer at the cap's outer opening, even when the bottle is upright, thereby minimizing or avoiding inadvertent leaking. However, the force of the spring is selected such that it is not so strong as to prevent the pet's drinking motion from pressing the ball slightly inward and moving it in a circuitous motion, thereby allowing fluid to flow to the pet.

According to a further preferred embodiment of the present disclosure, an alternative cap is provided that includes an internal ball captured therewithin and a washer mounted at or adjacent the top of the cap. Unlike the previously described embodiments, however, this further preferred embodiment omits a biasing spring. A ridge is formed on the internal surface of the cap and defines the position where the ball rests when the cap and bottle are upright. Another washer may be optionally provided between the ball and the internal ridge to enhance sealing therebetween. The optional washer is advantageously secured relative to the cap by a plurality of small projections/guides or a continuous lip or ridge, as described with reference to the first washer hereinabove.

Inclusion of the second washer advantageously provides an enhanced seal when the fluid-containing bottle is upright. Generally, the inclusion of the optional washer necessitates slightly greater space for ball movement, so that when the pet is drinking from the bottle and cap, the ball is not pushed so far inward that it is forced into engagement with the additional washer. If insufficient space is provided, smooth rolling of the ball is impeded and fluid flow unacceptably retarded. It is noteworthy, however, that inclusion of an additional washer is generally not necessary or feasible in embodiments that utilize a biasing spring, as described hereinabove, because the ball may be prevented from engaging the second washer by the interposition of the spring.

In a further exemplary embodiment, a control mechanism is disclosed for use with a vessel/container/bottle and includes a lower cap member, overcap member and a ball that is captured therebetween. The lower cap member is adapted to be mounted to a vessel, container or bottle, e.g., by screw threading or the like. The overcap member is adapted to be movably mounted relative to the lower cap, e.g., by threading engagement therewith. The ball typically rests on an internal flange or shelf formed in the lower cap member and, depending on the relative location of the overcap member, either prevents fluid from flowing through the control mechanism or permits fluid to flow therearound in a regulated fashion.

More particularly, in an exemplary embodiment of the disclosed control mechanism, the overcap member may be "tightened" such that the ball is prevented from movement relative to the lower cap/overcap members, thereby preventing fluid flow therearound. By moving the overcap member away from the lower cap member, the ball is freed up for rotational and axial (and limited lateral) motion within the space defined between the lower cap/overcap members, thereby permitting fluid flow from the vessel/container/ bottle and through an opening defined in the overcap member. Exemplary control mechanisms may include further advantageous features and functionalities, e.g., reference indicator(s) that reflect (e.g., on a relative basis) the degree to which fluid will flow therethrough, detent mechanisms for audibly and/or tactilely communicating the degree to which the control mechanism has been opened/closed, and/or a backflow mechanism to prevent fluid from returning to the vessel/container/bottle from the control mechanism. Additional features, functionalities and applications of exemplary control mechanisms according to the present disclosure are set forth in the detailed description which follows.

According to preferred embodiments of the present disclosure, the advantageous control mechanism and animal/pet drinking aid are fabricated from conventional materials of construction, e.g., plastic(s), rubber(s) and the like. The disclosed control mechanism and pet drinking aid are advantageously sized and dimensioned to be utilized with any standard size fluid bottle, as are known in the art. In addition, the size and dimensions of the disclosed control mechanism and animal/pet drinking aid may be modified, based on the teachings herein, to effectively interact with alternative and/or future fluid containers.

Control mechanisms and animal/pet drinking aids according to the present disclosure are relatively inexpensive to fabricate and provide an efficient, safe and reliable way to dispense fluids from a container/vessel/bottle and/or provide animals/pets with fluids from a bottle, particularly in instances and places where a bowl or other container is simply not a feasible or convenient choice. Thus, according to the present disclosure, a control mechanism and an animal/pet drinking aid are provided that allow users to avoid undesirable situations where the pet may gag or choke on fluids supplied from a typical water bottle. The disclosed control mechanism and animal/pet drinking aid advantageously overcome the potential for waste and spillage generally associated with fluids provided from containers/vessels/bottles, e.g., fluids provided to pets in portable water bowls and the like. Additional features, benefits and functionalities associated with control mechanisms and animal/pet drinking aids according to the present disclosure will be apparent from the detailed description which follows.

5. BRIEF DESCRIPTION OF THE FIGURES

The features, benefits and functionalities of the present disclosure will become more readily apparent to those skilled in the art from the following detailed description of preferred embodiment(s) when considered together with the accompanying drawings, wherein.

6. DETAILED DESCRIPTION OF PREFERRED EMBODIMENT(S)

The control mechanisms of the present disclosure advantageously regulate fluid flow from a container, vessel or bottle. The control mechanism may be provided as a free standing item, e.g., an accessory for independent purchase and use, or as part of an integrated product offering, e.g., permanently or detachably secured to a container, vessel or bottle. The disclosed control mechanisms may be employed in a variety of applications, e.g., to moderate and/or regulate flow of liquids, colloidal systems, suspensions and the like. For example, control mechanisms according to the present disclosure may be employed in systems wherein the fluid is to be consumed and in systems wherein the fluid is to be applied to a surface or substrate, e.g., deodorants/antiperspirants, fluid application systems such as wetting devices for mailing applications, colorant dispensers, inking mechanisms and the like. Thus, the disclosed control mechanisms may be employed in any application where it is desired to regulate the flow of a fluid's egress from a container, vessel or bottle.

In an exemplary application of the present disclosure, the control mechanisms may be employed in connection with an animal or pet drinking aid. The animal/pet drinking aids of the present disclosure provide pets, e.g., dogs, cats, ferrets, rodents and the like, with convenient and controlled access to fluid refreshment, e.g., when away from a home-based water bowl. As discussed in greater detail below, the disclosed animal/pet drinking aids overcome difficulties associated with typical water bottles that deliver uncontrolled fluid flow when fully or partially inverted. The uncontrolled fluid flow provided by such conventional water bottles often finds its way into a pet's windpipe or onto the ground, regardless of the effort and care expended in attempting to address the pet's thirst. The disclosed animal/pet drinking aids are advantageously sized and dimensioned to be utilized with any standard size fluid bottle, as are known in the art. Adjustments to the size and/or dimensions of the disclosed animal/pet drinking aids may be made to facilitate use with non-conventionally sized fluid bottles, as is apparent from the detailed description provided herein.

Although the exemplary control mechanisms of FIGS. 1–5 are referred to as pet drinking aids, it is to be understood that such devices/structures may be employed in a variety of applications, e.g., in systems wherein a fluid is to be consumed and/or in systems wherein a fluid is to be applied to a surface or substrate, as noted above. Accordingly, the exemplary pet drinking aids described hereinafter are illustrative of control mechanisms having a host of advantageous applications, including without limitation, as pet drinking aids.

Figure 1:
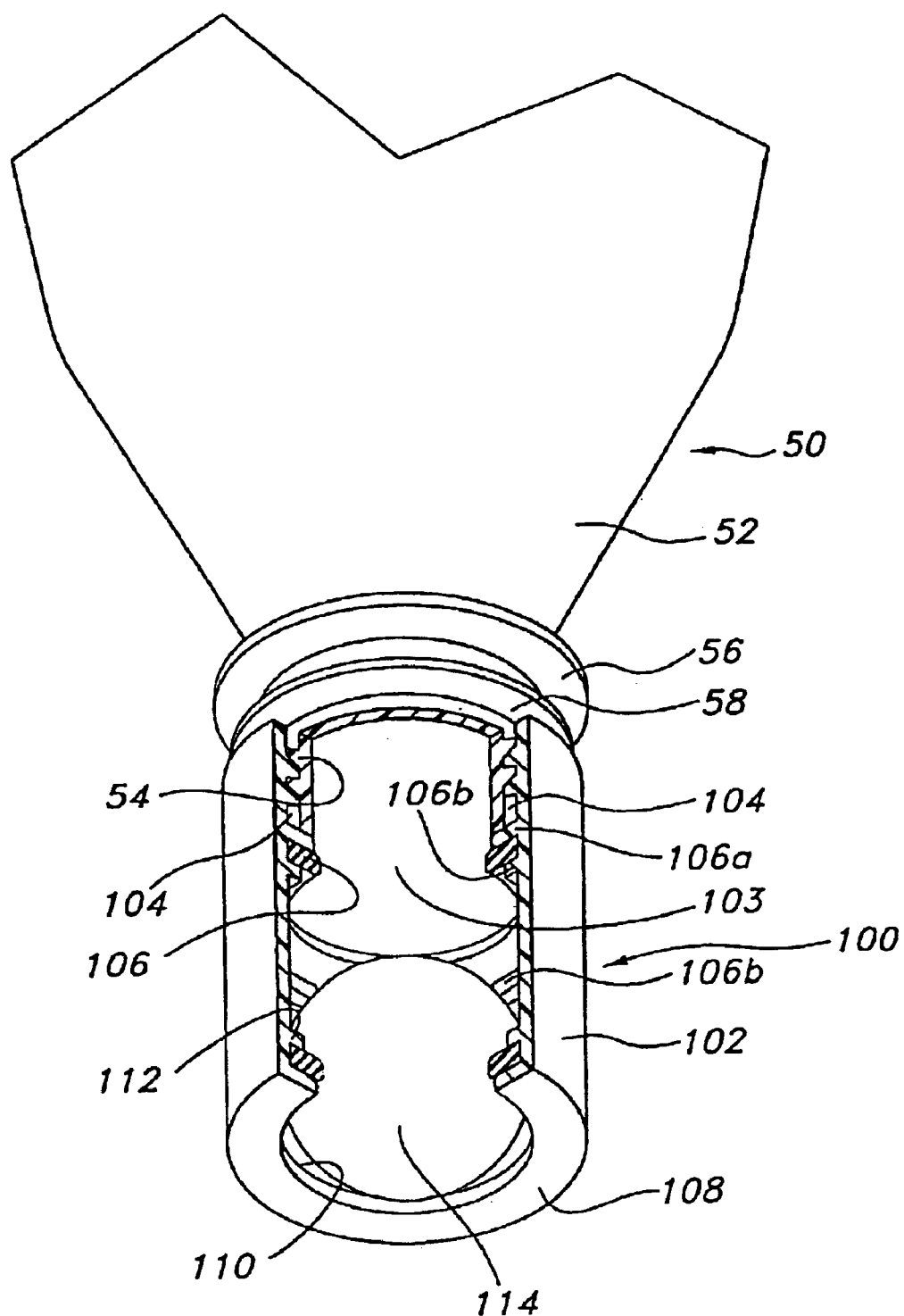
FIG. 1 is perspective side view, partially cut-away, of an exemplary embodiment of an animal/pet drinking aid according to the present disclosure, the pet drinking aid being mounted to a bottle.
Figure 2:
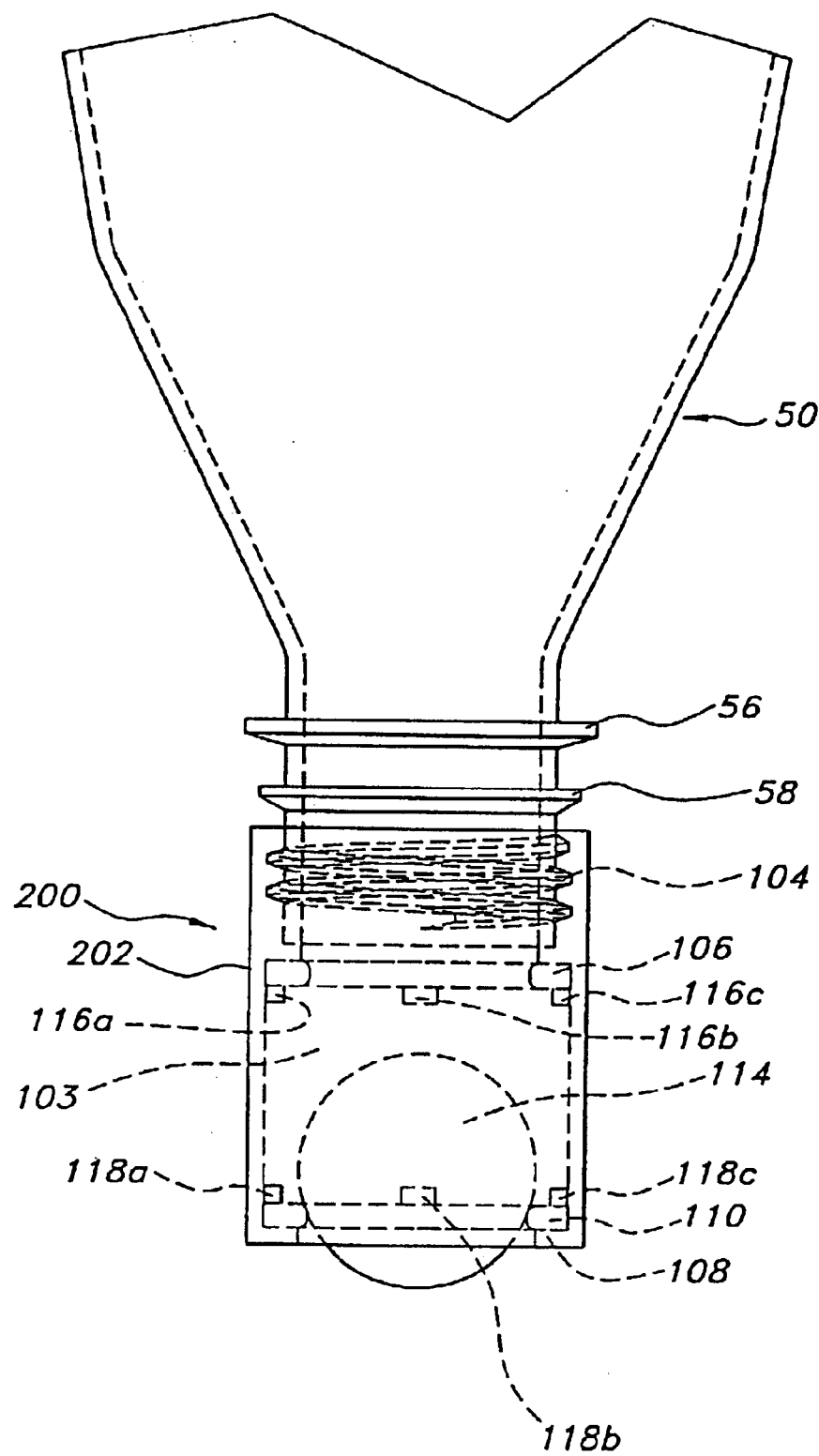
FIG. 2 is a side view, with elements shown in phantom, of the exemplary pet drinking aid and bottle of FIG. 1.

With reference to FIGS. 1 and 2, a first exemplary pet drinking aid 100 according to the present disclosure is depicted in conjunction with a conventional bottle 50. The bottle 50 includes a neck 52 that defines outwardly threaded portion 54. Two spaced, circumferential ridges 56, 58 are also defined on the outside of neck 52. Ridges 56, 58 are conventional in nature, and generally function to provide tamper resistance to bottle 50 through interaction with a conventional cap (not shown), as is known in the art.

Pet drinking aid 100 includes a cylindrical cap 102 that defines an axial passage 103 and inwardly directed threads 104 at a first end thereof. Inwardly directed threads function as exemplary means for detachably securing pet drinking aid 100 to bottle 50 according to the present disclosure. The thread pitch and spacing of inwardly directed threads 104 are generally selected so as to cooperate with conventional drinking fluid containers/bottles, e.g., bottled water and/or soda containers. Cylindrical cap 102 is generally fabricated from conventional plastic materials, as are known in the art.

An inwardly directed, circumferential flange or rim 108 is defined at an opposite end of cap 102. Flange 108 is typically integrally formed with cap 102, although a cooperating flange structure may be joined to cylindrical cap 102, if so desired. Flange 108 provides an abutment surface for positioning a washer 110 within the passage defined by cap 102. Washer 110 provides an enhanced fluid seal when a pet is not accessing fluid contained within the bottle 50, as discussed in greater detail below. Washer 110 is fabricated from conventional elastomeric materials, e.g., rubber, to facilitate the sealing function performed thereby.

A continuous, circumferential lip or ridge 112 is advantageously formed on the interior surface of cap 102 in spaced relation relative to flange 108. Circumferential lip 112 functions in cooperation with flange 108 to more reliably secure washer 110 in position within cap 102. Lip 112 is generally fabricated such that its thickness is less than the thickness of washer 110. The thickness of circumferential lip 112 is selected so as not to impede/interfere with ball 114 (discussed below) sealing against washer 110.

In alternative embodiments of the present disclosure, a plurality of guides and/or projections may be provided in lieu of circumferential lip 112 to reliably secure washer 110 in position. In such alternative embodiments, the length of the guides/projections is selected so as to ensure a desired level of security while simultaneously permitting facile assembly of the device. The thickness of the guides/projections is generally selected so as not to impede/interfere with sealing interaction between washer 110 and ball 114. Thus, for example, the guides/projections may be fabricated such that they are about half the thickness of washer 110, and the guides/projections may be circumferentially spaced around the interior of cap 102, e.g., one guide/projection located at 0 degrees, one at 90 degrees, one at 180 degrees and one at 270 degrees.

A second washer 106 is generally provided at a predefined distance from the first end of cylindrical cap 102, i.e., from washer 110 and flange 108. Second washer 106 is typically secured in place by structural features formed on the inside surface of cap 102, e.g., between first and second securing flanges 106a, 106b. Second washer 106 is fabricated from the same types of materials as washer 110, and may be identical in all respects to washer 110. The spacing between washer 110 and second washer 106 is selected so as to permit movement of ball 114, as discussed herein below. In a preferred embodiment of the present disclosure, second washer 106 is located at a position intermediate the first and second ends of cap 102 and axial passage 103, and in a particularly preferred embodiment, second washer 106 is positioned substantially at or near the midpoint of axial passage 103.

With further reference to FIG. 1, a ball 114 is positioned for movement within axial passage 103. Ball 114 is generally spherical in shape and fabricated from a substantially non-deformable material, e.g., rubber or a hard plastic. Ball 114 is captured within axial passage 103 by washer 110 and second washer 106, i.e., removal of ball 114 from cap 102 is prevented by the diameters of the passages through washer 110 and second washer 106. The diameter of ball 114 is thus characterized in that it is less than the diameter of inner passage 103, but greater than the diameter of the openings formed in washer 110 and second washer 106.

Based on the manner in which ball 114 is captured within axial passage 103, ball 114 is capable of rotatable movement and limited axial movement relative to cap 102. As shown in FIG. 1, bottle 50 and cap 102 are shown fully inverted, such that fluid within bottle 50 flows into axial passage 103 and bears against ball 114. Ball 114 engages washer 110 and forms a seal therewith. Thus, in the absence of movement of ball 114 relative to washer 110, i.e., rotatable and/or axial movement of ball 114, fluid is prevented from exiting axial passage 103 through flange 108. Thus, bottle 50 may be inverted without fluid leakage due to sealing interaction between ball 114 and the washer 110.

With bottle 50 fully or partially inverted, if a pet licks the exposed portion of ball 114, the motion and pressure from the pet's tongue pushes the ball in slightly, i.e., against the downward pressure of the fluid within axial passage 103, and generally causes rotational motion of ball 114 relative to cap 102. The movement of ball 114 (rotational and/or axial) relative to cap 102 allows fluid within the bottle to flow around the ball. Thus, as the pet licks ball 114, the ball assumes a recessed position within axial passage 103 of cap 102 relative to the sealing orientation depicted in FIG. 1, and simultaneously spins/rotates, thereby allowing fluid to continuously flow to the pet's mouth.

When the pet's licking action ceases (and assuming bottle 50 remains in an inverted or slightly inverted orientation), ball 114 returns to its position of sealing engagement with washer 110, e.g., under the continued downward force of fluid contained within axial passage, thereby discontinuing the flow of fluid to the pet. When bottle 50 is rotated to a non-inverted orientation, the downward force on ball 114 supplied by fluid within axial passage 103 (and gravity) is removed. In the absence of such downward force, ball 114 reorients itself within axial passage 103 such that it engages second washer 106. The engagement between ball 114 and second washer 106 functions to substantially "close" bottle 50 when in the non-inverted orientation, thereby preventing significant, undesired fluid dispersal through cap 102.

With reference to FIG. 2, an alternative embodiment of a pet drinking aid 200 is schematically depicted in cross section. Pet drinking aid 200 features many of the same structures and functions as are described herein above with reference to pet drinking aid 100 and, in the interest of clarity, the same numeric designations are employed for structures that are unchanged relative to pet drinking aid 100. Thus, for example, pet drinking aid 200 includes a cylindrical cap 202 that is detachably secured to a bottle 50 through helical threads 104. Cap 202 defines an axial passage 103 and a flange or rim 108 at an end opposite helical threads 104.

Washer 110 is positioned adjacent flange 108 and second washer 106 is positioned intermediate the first and second ends of cap 202. However, unlike cap 102 of pet drinking aid 100, cap 202 includes a plurality of guides or projections 118a, 118b, 118c for securing washer 110 relative to cap 202. Three guides 118a, 118b, 118c are depicted in the cross sectional view of FIG. 2. However, a fourth guide/projection (not pictured) is positioned opposite guide 118b. Thus, according to a preferred embodiment of the present disclosure, guides 118a, 118b, 118c and the unpictured guide are circumferentially spaced around the interior surface of cap 202, i.e., spaced 90° from each other. Thus, a guide is advantageously formed at 0°, 90°, 180° and 270°. The disclosed guides/projections are generally integrally formed with cap 202, i.e., formed in connection with the conventional molding of cap 202.

With further reference to FIG. 2, guides or projections 116a, 116b, 116c are provided in place of securing flange 106b. Guides 116a, 116b, 116c extend inwardly from the inner surface of cap 202 and are preferably integrally formed with cap 202, e.g., during the molding of cap 202. A fourth, non-pictured guide is positioned opposite guide 116b.

The lengths of the guides/projections 116a, 116b, 116c and 118a, 118b, 118c schematically depicted in FIG. 2 are generally selected so as to ensure a desired level of security for washers 106 and 110, respectively, while simultaneously permitting facile assembly of pet drinking aid 200. Thus, for example, the foregoing guides/projections may be advantageously fabricated such that they are about half the thickness of the washer material. In addition, the thickness of the guides/projections is selected so as not to impede/interfere with ball 114 sealing against washers 106, 110.

Figure 3:
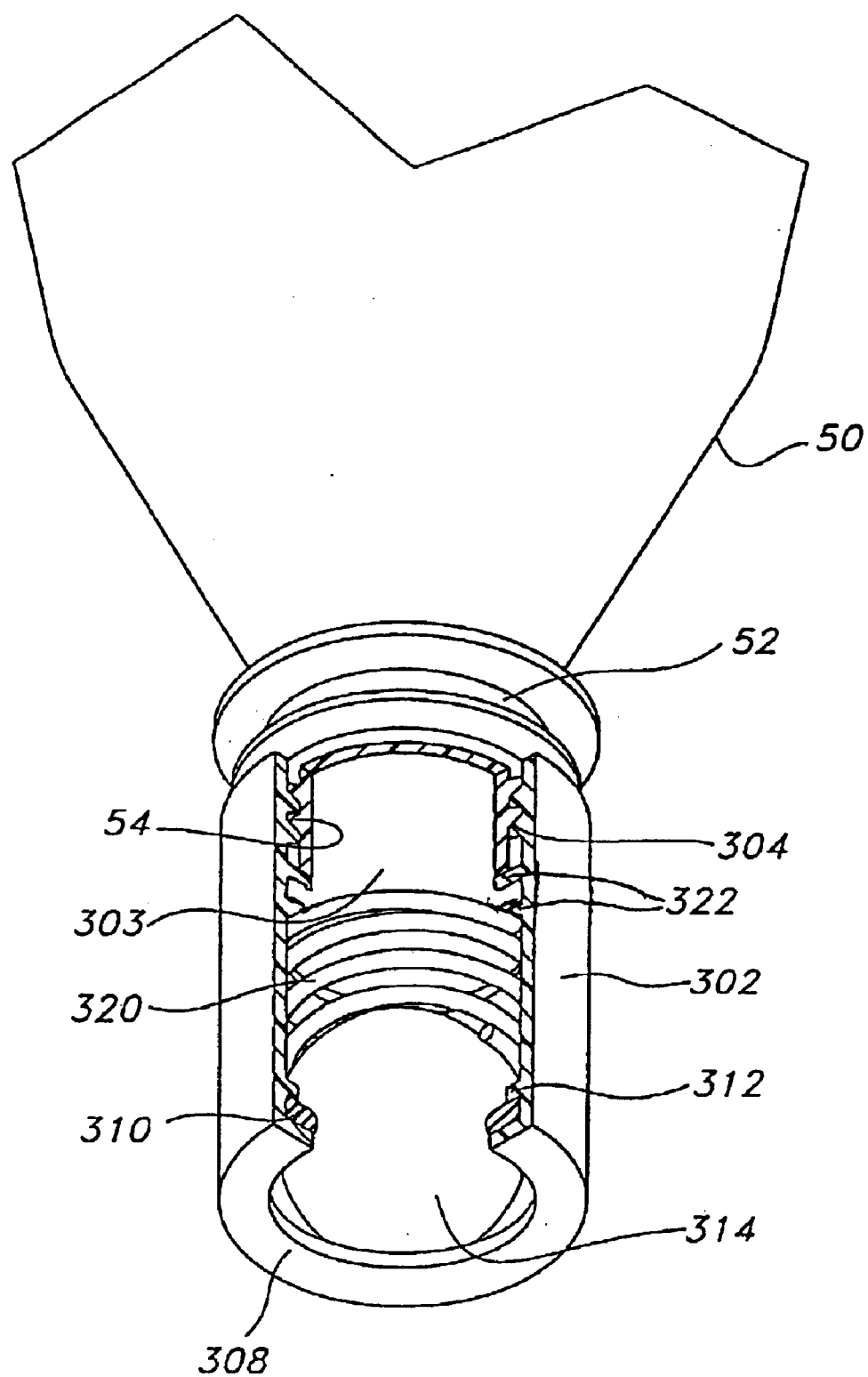
FIG. 3 is perspective side view, partially cut-away, of a second exemplary embodiment of a pet drinking aid according to the present disclosure, the pet drinking aid being mounted to a bottle.
Figure 4:
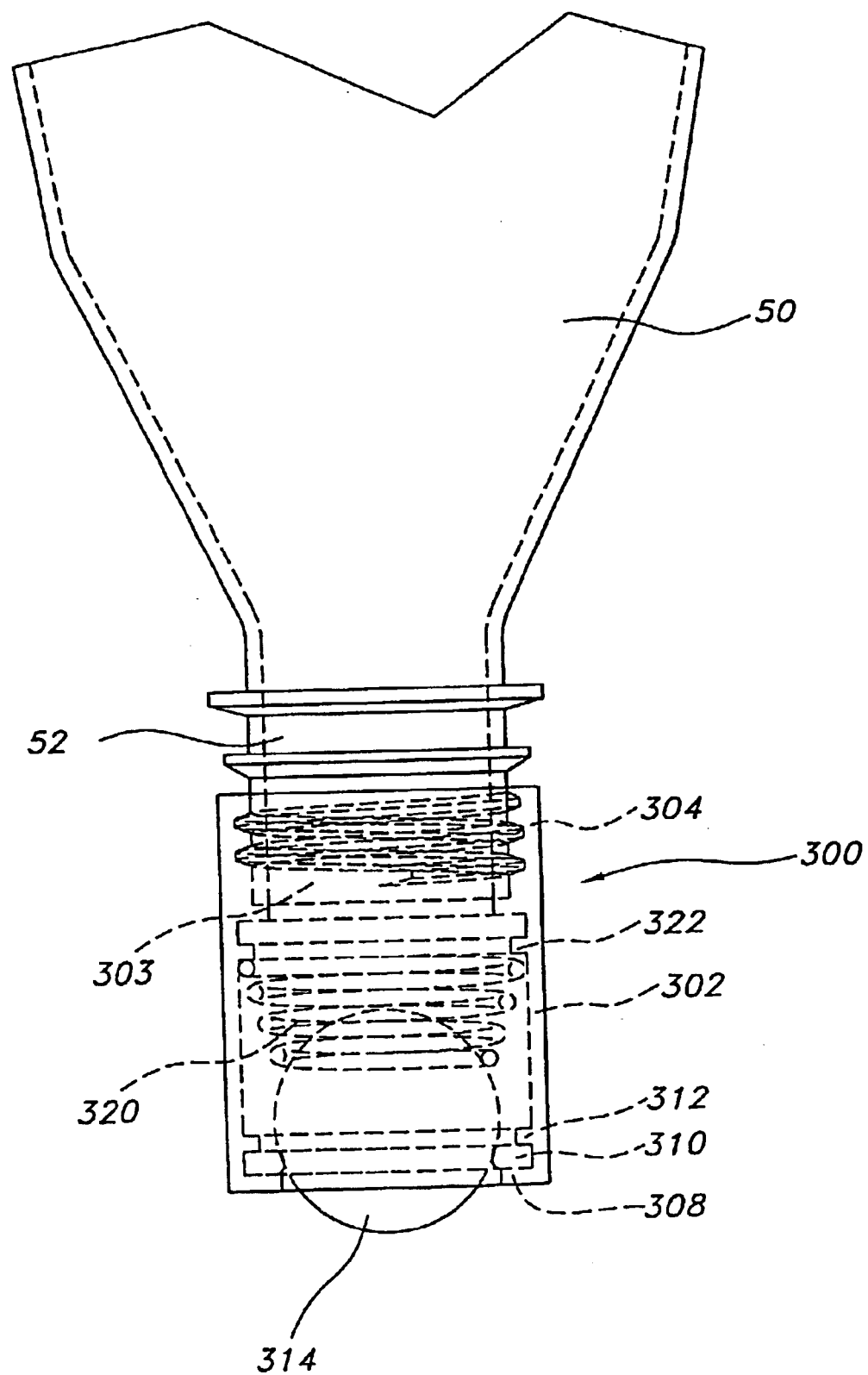
FIG. 4 is a side view, with elements shown in phantom, of the exemplary pet drinking aid and bottle of FIG. 3.

Turning to FIGS. 3 and 4, an alternative exemplary pet drinking aid embodiment of the present disclosure is depicted in which identical reference designations are used to identify structures that correspond to structures discussed with reference to the preceding embodiments. Pet drinking aid 300 is depicted in conjunction with a conventional bottle 50 that includes a neck 52 having outwardly threaded portion 54. Pet drinking aid 300 includes a cylindrical cap 302 that defines an axial passage 303 and inwardly directed threads 304 at a first end thereof. Inwardly directed threads function as exemplary means for detachably securing pet drinking aid 300 to bottle 50 according to the present disclosure. The thread pitch and spacing of inwardly directed threads 304 are generally selected so as to cooperate with conventional drinking fluid containers/bottles, e.g., bottled water and/or soda containers. Cylindrical cap 302 is generally fabricated from conventional plastic materials, as are known in the art.

An inwardly directed, circumferential flange or rim 308 is defined at an opposite end of cap 302. Flange 308 is typically integrally formed with cap 302, although a cooperating flange structure may be joined to cylindrical cap 302, if so desired. Flange 308 provides an abutment surface for positioning a washer 310 within the axial passage 303 defined by cap 302. Washer 310 provides an enhanced fluid seal when a pet is not accessing fluid contained within the bottle 50, as discussed in greater detail below. Washer 310 is fabricated from conventional elastomeric materials, e.g., rubber, to facilitate the sealing function performed thereby. A continuous, circumferential lip or ridge 312 is formed on the interior surface of cap 302 in spaced relation relative to flange 308 which functions in cooperation with flange 308 to more reliably secure washer 310 in position within cap 302. The thickness of circumferential lip 312 is selected so as not to impede/interfere with ball 314 sealing against washer 310.

A ball 314 is positioned for movement within axial passage 303 of cap 302. Ball 314 is generally spherical in shape and fabricated from a substantially non-deformable material, e.g., rubber or a hard plastic. A compression spring 320 is positioned within axial passage 303 and engages, i.e., contacts, ball 314 at one end thereof. At the other end, compression spring 320 is mounted relative to the inner surface of cap 302 with respect to ridge 322. Spring 320 may be staked, glued or otherwise mounted to cap 302, or may be merely captured between a ridge and ball 314. In a preferred embodiment of the present disclosure, the ridge is positioned at or near the midpoint of cap 302. Alternatively, the base of spring 320 may be positioned between and secured relative to spaced ridges 322 formed in cap 302, or positioned between and secured relative to a plurality of spaced, inwardly projecting guides and/or projections formed in the cap. In this latter embodiment, axially spaced sets of inwardly projecting guides and/or projections may be provided, e.g., at the axial locations of ridges 322 of FIG. 4. As will be readily apparent to persons skilled in the art, each of such arrangements constitutes a means of mounting spring 320 relative to cap 302 for purposes of the present disclosure.

Ball 314 is thus captured within axial passage 303 between washer 310 and compression spring 320, and is resiliently biased toward the dispensing end of cap 302. The diameter of compression spring 320 is generally slightly less than the diameter of ball 314 where it contacts the ball, thereby ensuring that spring 320 maintains engagement with ball 314, i.e., the ball is not able to pass through the center of the spring. The removal of ball 314 from cap 302 is prevented by the diameter of the opening formed in washer 310 and the inner diameter of compression spring 320. The diameter of ball 314 is thus characterized in that it is less than the diameter of inner passage 103, but greater than the diameter of the openings formed in washer 310 and compression spring 320.

Compression spring 320 may be fabricated from a variety of materials, e.g., plastic, metal and the like. Alternatively, a hollow, biasing foam member may be substituted for compression spring 320 to bias ball 314 toward the dispensing end of cap 302. A compression spring and hollow, biasing foam member are exemplary biasing means for biasing ball 314 toward inwardly directed flange 308. Of note, with reference to the cap embodiment of FIGS. 3 and 4, with the inclusion of compression spring 320, a washer is generally not included in juxtaposition to spaced ridges 322 (or inwardly projecting guides and/or projections). Nonetheless, it may be desirable to form ridges 322 (or the guides/projections) in cap 302, e.g., if a single mold is fabricated for the manufacture of caps that both include and do not include a compression spring. Moreover, the presence of ridges 322 (or the guides/projections) may facilitate the mounting of compression spring 322 relative to cap 302, as discussed herein above.

Several forces cooperate or interact to control/moderate the flow of fluid from a bottle/cap according to embodiments of the present disclosure that include a biasing means, e.g., a compression spring. For example, the spring bias and the fluid pressure associated with the inversion (full or partial) of the bottle generally acts against the force of the pet's tongue to determine the degree to which fluid flows from the bottle. Moreover, the speed with which the ball is rotated by the pet's tongue influences the fluid dispensing rate and/or volume. The additional force supplied by the spring bias advantageously provides a tighter seal to the cap of the present disclosure, particularly in circumstances where the bottle is positioned upright. That is, the spring continuously provides force for the ball to contact the washer at the cap's outer opening, even when the bottle is upright, thereby minimizing or avoiding inadvertent leaking. However, the force of the spring is selected such that it is not so strong as to prevent the pet's drinking motion from pressing the ball slightly inward and moving it in a circuitous motion, thereby allowing fluid to flow to the pet.

Once cap 302 is mounted to bottle 50 according to preferred embodiments of the present disclosure, and the bottle is fully or partially inverted, the motion/pressure supplied to ball 314 by the pet's tongue, e.g., when licking in the vicinity of flange 308, pushes ball 314 in slightly, i.e., against the bias of compression spring 320 positioned therebehind. The movement of ball 314 relative to cap 302 (rotatable and/or axial) allows fluid within the bottle to flow around the ball. Thus, as the pet licks ball 314, the ball assumes a slightly recessed position within cap 302 and simultaneously spins/rotates, thereby allowing fluid to continuously flow to the pet's mouth. When the pet's licking action ceases, compression spring 320 advantageously biases ball 314 back into sealing engagement with washer 310 positioned adjacent the flange 308, thereby discontinuing the flow of fluid to the pet, regardless of the orientation of bottle 50. When bottle 50 is rotated to a non-inverted orientation, the biasing force applied to ball 314 by compression spring 320 advantageously maintains the ball in sealing engagement with washer 310.

Figure 5:
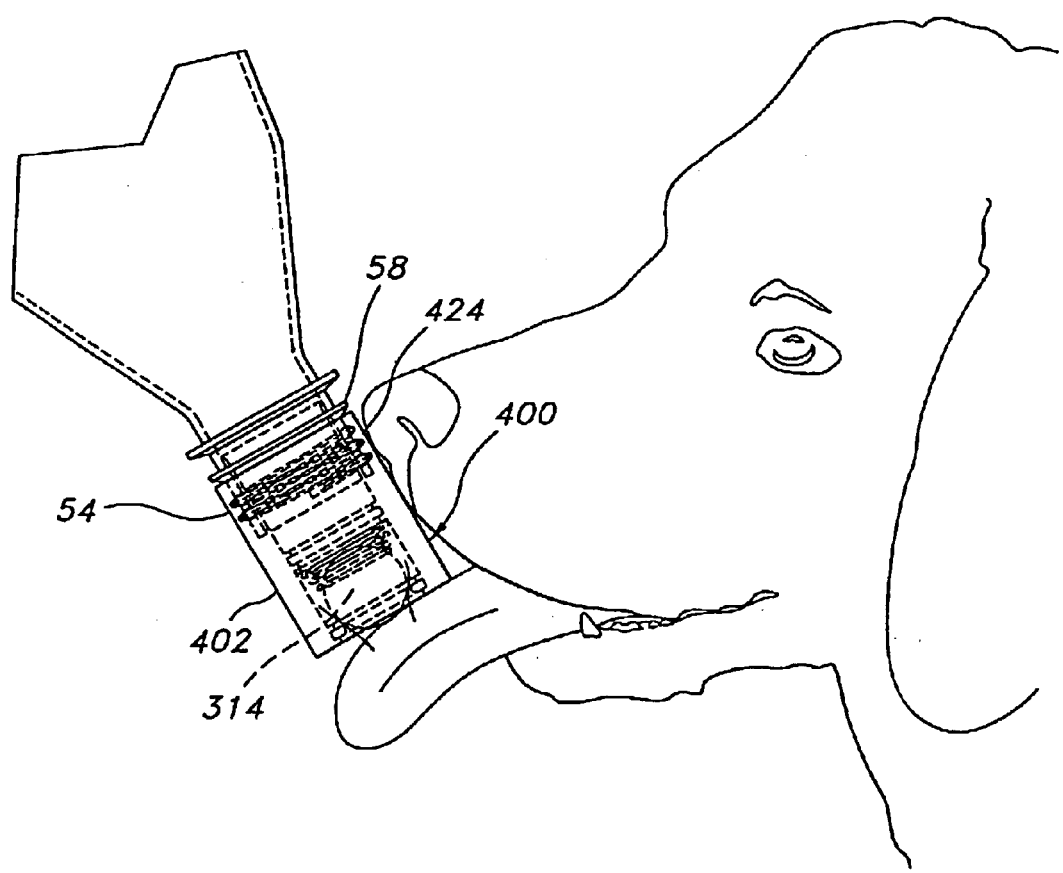
FIG. 5 is a perspective side view of the exemplary pet drinking aid and bottle of FIGS. 3 and 4 in use.

With reference to FIG. 5, a further exemplary embodiment of the pet drinking aid of the present disclosure is depicted. Pet drinking aid 400 is similar in most respects to pet drinking aid 300 described herein above with reference to FIGS. 3 and 4. Thus, pet drinking aid 400 includes a compression spring 320 that biases ball 314 into engagement with washer 310 positioned adjacent flange 308. However, unlike pet drinking aid 300, the cap 402 of pet drinking aid 400 is detachably mounted to bottle 50 by way of an elastomeric sleeve 424 that advantageously fits over and resiliently engages neck 52 of bottle 50. Elastomeric sleeve 424 is secured to the cap 402 through appropriate mounting means, e.g., glue, a cooperative tongue and groove structure, and the like, and facilitates detachably mounting of cap 402 to a bottle, thereby obviating the need for cooperative threads as between the cap and the bottle. Elastomeric sleeve 424 may be fabricated from a host of elastomeric materials, e.g., rubber, elastomeric polymer or similar material as would be apparent to persons skilled in the art. The inner diameter of elastomeric sleeve 424 in its rest, i.e., non-stretched condition, is typically slightly less than the maximum diameter of the neck of the bottle to which it is to be secured. For purposes of diameter selection, the diameter of the bottle's neck is deemed include the threads and/or lip formed on the neck of the bottle. Thus, elastomeric sleeve 424 is sized and configured to stretch over the neck of a bottle and maintain a secure relationship therewith unless and until subsequently removed by the user.

The pet drinking aids of the present disclosure are relatively inexpensive to fabricate and provide an efficient, safe and reliable way to provide pets with fluids from a bottle, particularly in instances and places where a bowl or other container is simply not a feasible or convenient choice. Thus, according to the present disclosure, a pet drinking aid is provided that allows users to avoid undesirable situations where the pet may gag or choke on fluids supplied from a typical water bottle. The disclosed pet drinking aid advantageously overcomes the potential for waste and spillage generally associated with fluids provided to pets in portable water bowls and the like.

Turning to FIGS. 6–10, an exemplary control mechanism 500 for use with a container, vessel and/or bottle is depicted. Control mechanism 500 may be used in a host of applications, including systems wherein a fluid is to be consumed, e.g., an animal/pet drinking aid, and systems wherein a fluid is to be applied to a surface or substrate, e.g., as part of a deodorant, anti-perspirant or other fluid dispensing apparatus and/or in wetting envelopes, applying a colorant or adherent to a substrate, and the like. As will be apparent to persons skilled in the art, the disclosed control mechanism may be employed in any application where it is desired to control and/or regulate fluid flow from a container, vessel and/or bottle. Control mechanism 500 advantageously comprises only three structural elements: a lower cap member, an overcap and a ball.

Figure 6:
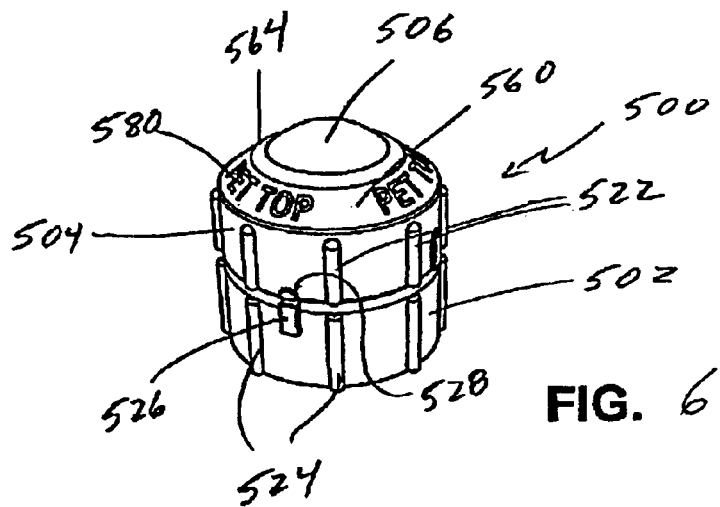
FIG. 6 is a perspective view of an exemplary control mechanism according to the present disclosure.
Figure 7:
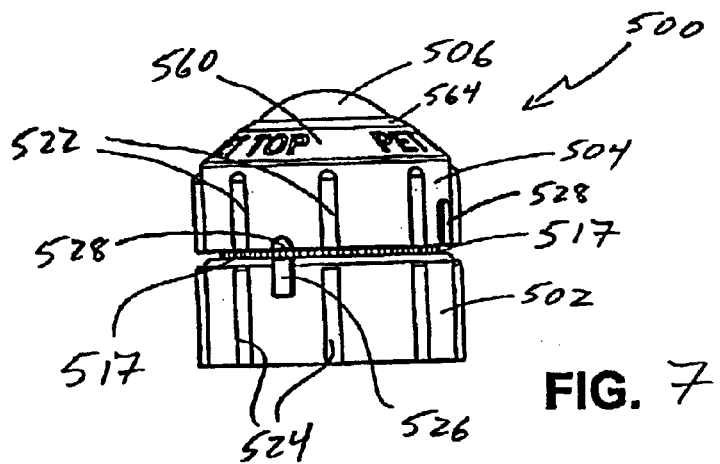
FIG. 7 is a side view of the exemplary control mechanism of FIG. 6.
Figure 8:
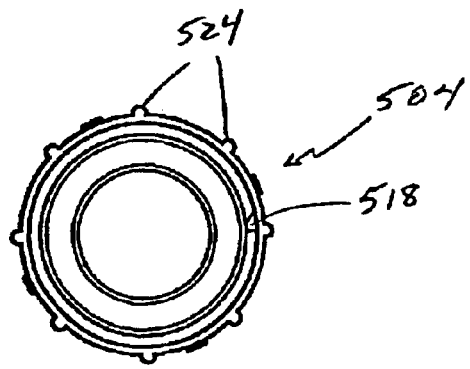
FIG. 8 is a bottom view of an exemplary overcap member according to the control mechanism of FIGS. 6 and 7.
Figure 9:
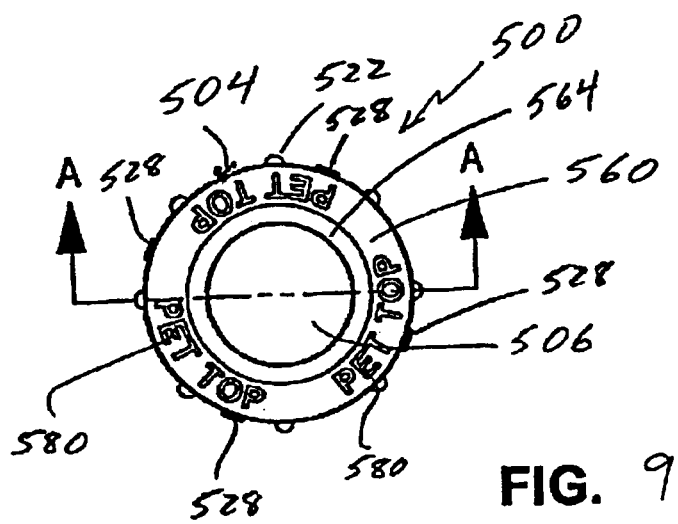
FIG. 9 is a top view of the exemplary control mechanism of FIGS. 6 and 7.
Figure 10:
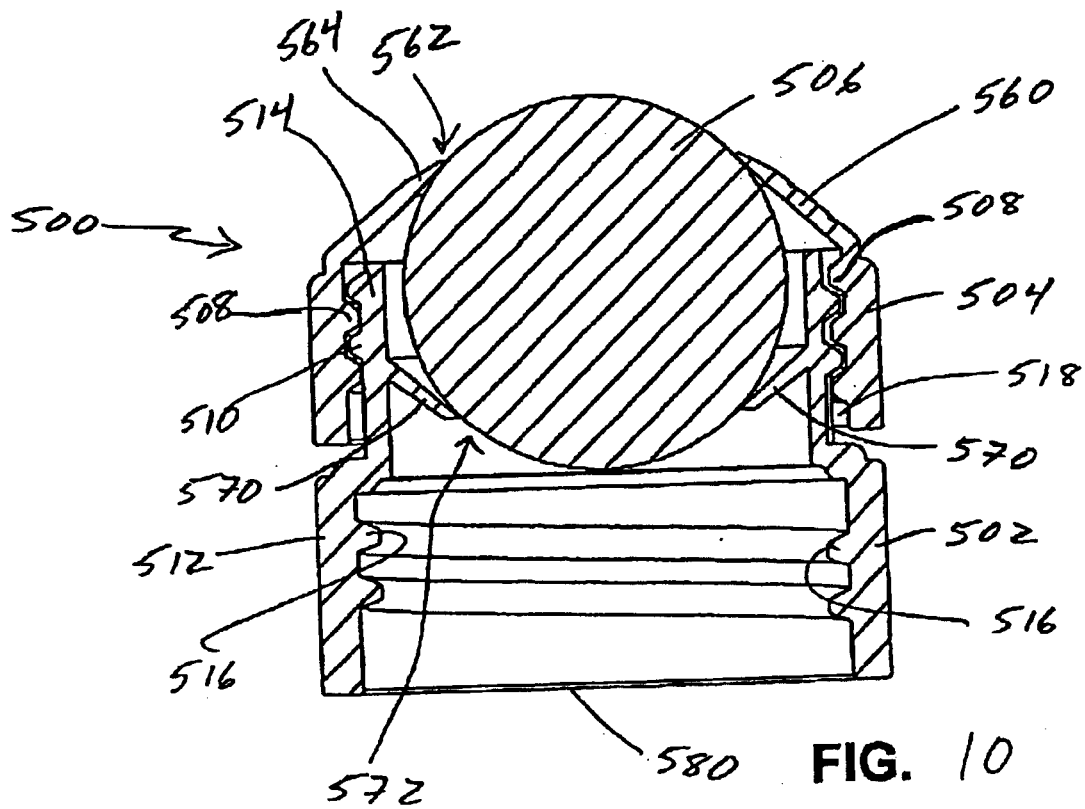
FIG. 10 is a sectional side view of the exemplary control mechanism of FIG. 9, taken along line A—A.

With particular reference to FIGS. 6, 7 and 10, control mechanism 500 includes a lower cap member 502, an overcap member 504 and a ball 506. Control mechanism 500 is substantially cylindrical in shape, with a truncated, conical upper portion formed by overcap member 504. The diameter of control mechanism 500 is generally defined based on the size and/or dimensions of the neck of the container, vessel or bottle with which it is intended to cooperate.

With particular reference to the cross-sectional view of FIG. 10, lower cap member 502 includes a cylindrical base portion 512 and a cylindrical mating extension 514. A helical thread 516 is formed on the inner surface of base portion 512 to facilitate mounting of control mechanism 500 to a bottle or the like. Alternative mounting mechanisms may be employed to facilitate mounting of control mechanism 500 to a desired container, vessel or bottle, as will be apparent to persons skilled in the art, e.g., a bayonet lock mechanism, friction fit design or the like. Thus, the present disclosure is not limited to control mechanisms that are adapted to be joined to a container, vessel or bottle through a threading action, nor is the present disclosure limited to control mechanisms that are detachably mounted to a vessel, container or bottle. Rather, the disclosed control mechanism may be advantageously joined to such vessel, container or bottle in a substantially permanent manner, e.g., through the use of a suitable adhesive, sonic welding or the like.

With further reference to FIG. 10, mating extension 514 includes a helical thread 510 formed on an external surface thereof. Helical thread 514 is adapted to cooperate with a corresponding helical thread 508 formed on the interior surface of overcap 504. Thus, the diameters of mating extension 514 and overcap member 504 are selected such that helical thread 510 effectively cooperates with helical thread 508 to facilitate movement of overcap member 504 relative to lower cap member 502, i.e., based on the rotational motion of overcap 504 relative to lower cap member 502. Typically, overcap member 504 may be unscrewed relative to lower cap member 502 through counterclockwise rotation thereof, and tightened relative to lower cap member 502 through clockwise rotation.

With reference to FIG. 7, a series of ridges 517 are formed on the exterior surface of mating extension 514, particularly at the lower end thereof. Ridges 517 are typically vertically oriented and typically extend circumferentially, in a spaced side-by-side arrangement, around mating extension 514. As noted previously, a helical thread 510 extends around mating extension 514. According to an exemplary embodiment of the present disclosure, ridges 517 circumferentially increase in height so as to substantially track helical thread 510. Thus, according to such exemplary embodiment, each ridge 517 extends upwardly on mating extension 514 such that the ridge 517 ends at (or near) the lowest extremity of helical thread 510, i.e., the ridge 517 typically ends at, or immediately short of helical thread 510. In an alternative embodiment, one or more ridges 517 may extend into the space between adjacent helical thread portions. A stop 518 (see FIGS. 8 and 10) is advantageously formed on the interior of overcap 504, e.g., at or near the end of thread 508. Stop 518 extends inwardly and typically performs three functions in combination with lower cap member 502.

First, stop 518 contacts the series of ridges 517 to provide a tactile sensation as overcap 504 is rotated relative to lower cap member 502. This tactile sensation provides advantageous tactile feedback to a user who is undertaking to "open" or "close" control mechanism 500. Second, stop 518 is adapted to engage a single ridge formed near the top of the highest thread on lower cap member 502. This engagement between stop 518 and a corresponding "stop ridge" formed on cap member 502 functions to prevent overcap 504 from becoming disengaged from cap member 502, absent a level of force required to overcome such engagement. Of note, stop 518 includes an angled or tapered surface on the side opposite its "engagement" side, thereby facilitating initial assembly of overcap 504 onto cap member 502. Finally, stop 518 interacts with ridges 517 such that, during use, overcap 504 is less susceptible to unintended rotational motion relative to cap member 502, e.g., when an animal is licking ball 506, as described below. Thus, the interaction between stop 518 and the ridges formed on cap member 502 facilitates the operability and stability of control mechanism 500.

Gripping ridges 522, 524 are typically formed on the exterior of overcap 504 and cap member 502, respectively. Gripping ridges 522, 524 are circumferentially spaced around the periphery of overcap 504 and cap member 502, and are typically vertically oriented. Although the number of gripping ridges is a matter of design choice and is typically dependent, at least in part, on the diameter of a specific control mechanism, according to exemplary embodiments of the present disclosure, about six to twelve gripping ridges are typically defined on each of the overcap and cap member. An equal number of equally spaced gripping ridges are typically provided, although the disclosure is not limited to such an arrangement.

In addition to gripping ridges 522, 524, reference marker 526 is formed on the exterior surface of cap member 502, at or near the top thereof. A series of positional markers 528 are formed on the exterior of overcap 504, toward the bottom thereof. A first positional marker 528 is typically located on overcap 504 and, in one exemplary embodiment of the present disclosure, the first positional marker 528 is aligned with reference marker 526 (or in close proximity thereto) when overcap 504 is fully "tightened down" on cap member 502, i.e., control mechanism 500 is closed. The additional positional markers 528 are circumferentially spaced around the periphery of overcap 504 (see FIG. 9) and, based on alignment of such additional positional markers 528 with reference marker 526, reflect the degree to which control mechanism 500 has been opened (by rotation of overcap 504 relative to cap member 502).

In fabricating control mechanism 500, the various positional markers 528 may be designated as reflecting varying degrees of flow, whether in absolute flow terms (e.g., based on flow measurements) or in relative flow terms (e.g., big thirst/medium thirst/little thirst; big dog/little dog/puppy; wide open/medium flow/trickle; etc.). As shown in FIGS. 6 and 7, the relative length of positional markers 528 may increase to reflect relative increases in the degree of flow through control mechanism 500. Other "flow-related" indicia may be incorporated with positional markers 528 to reflect relative flow, as will be apparent to persons skilled in the art. In the exemplary embodiment of FIGS. 6–10, four equally spaced positional markers 528 are provided, but the present disclosure is not limited to such arrangement, as will be readily apparent to persons skilled in the art.

With particular reference to FIG. 10, ball 506 is captured between overcap 504 and cap member 502. In exemplary control mechanism 500, a beveled top surface 560 and central opening 562 are defined by overcap 502. Central opening 562 is substantially circular in geometry and is sized such that ball 506 cannot pass therethrough. Thus, in an exemplary embodiment of the present disclosure, central opening 562 may be about 0.5 to 0.75 inches in diameter, while ball 506 may have a diameter of about 0.75 to 0.9 inches. The precise dimensions of ball 506 and central opening 562 are not critical, so long as ball 506 is not permitted to pass through such opening. In the disclosed embodiment of FIGS. 6–10, beveled top surface 560 includes a chamfered region 564 adjacent central opening 562. Chamfered region 564 provides a smoother transition between overcap 504 and ball 506, thereby providing for more efficacious use of control mechanism 500, e.g., as a drinking aid for a pet.

Cap member 502 defines an inwardly directly conical flange 570 that supports ball 506 at the side opposite beveled top surface 560. Conical flange 570 defines an opening 572 that, in exemplary embodiments of the present disclosure, is substantially circular in geometry. The diameter of opening 572 is sized such that ball 506 is not permitted to pass through. Thus, the parameters for sizing opening 572 are analogous to those applicable to central opening 562 of overcap 504, discussed above. Both beveled top surface 560 and conical flange 570 are fabricated from substantially rigid materials, e.g., appropriate plastic materials, so that the motion of ball 506 within control mechanism 500 is substantially limited to rotational motion between beveled top surface 560 and conical flange 570.

In use, the rotation/movement of ball 506 is generally prevented when overcap 560 is tightened relative to cap member 502. In such circumstance, beveled top surface 560 and conical flange 570 bear against ball 506 to completely restrict/block the potential fluid flow path from end 580 of control mechanism 500. Thus, at opposed sides of ball 506, a substantially circumferential bearing surface is defined between ball 506 and beveled top surface 560/conical flange 570, respectively. When overcap 504 is rotated relative to cap member 502 such that beveled top surface 560 moves away from ball 506, movement of ball 506 relative to both overcap 504 and cap member 502 is permitted based on the circumferential clearance regions that are created therebetween. The relative size of such clearance regions which define a "variable flow clearance" is dependent on the degree to which overcap 504 is moved away from cap member 502, i.e., the degree to which overcap 502 is rotated relative to cap member.

As overcap 504 is moved away from cap member 502, ball 506 is provided with multiple freedoms of movement: rotational, axial and limited lateral movement. The degree of axial movement permitted ball 506 is particularly dependent on the degree to which overcap 504 is moved away from cap member. Axial movement of ball 506 within the constrained space between overcap 504 and cap member 502 to permit greater fluid flow around and past ball 506 may be effected by a user of the disclosed control mechanism. Thus, for example, when control mechanism 500 is used to provide fluid refreshment to an animal or pet, e.g., a dog, cat, rodent or the like, the animal's tongue may simultaneously cause rotational movement of ball 506, axial movement of ball 506 away from overcap 504, and limited lateral movement of ball 506 within the confined region, thereby establishing a greater clearance for fluid flow around ball 506 when the dog's tongue is in contact with ball 506. When the vessel/container is inverted and the animal's tongue is moved away from ball 506, fluid flow is generally restricted or curtailed, e.g., based on the forces of gravity and fluid pressure on ball 506 bringing ball 506 into restrictive contact with overcap 504. When it is desired to positively discontinue fluid flow through control mechanism 500, overcap 502 may be rotated in the opposite direction relative to cap member 504, thereby closing off the noted clearance regions.

In circumstances where control mechanism 500 may be used to deliver fluid to an animal, e.g., a dog, cat, rodent, ferret or the like, the material of construction for ball 506 is advantageously selected to have a specific gravity that is greater than the specific gravity of the fluid to be dispensed therethrough. By employing a material having the foregoing specific gravity, operation of ball 506 is generally improved because ball 506 does not "float" relative to the fluid and is more susceptible to rotational motion based on forces applied by the animal's tongue.

Product indicia, brand information or other relevant information may be advantageously presented on control mechanisms according to the present disclosure. Thus, with further reference to FIGS. 6, 7 and 9, control mechanism 500 includes product indicia 580 formed on the beveled top surface 560 of overcap 502. In the disclosed exemplary embodiment, product indicia 580 constitutes a product brand name ("Pet Top") for control mechanism 500. Product indicia may be printed, embossed, molded or otherwise applied to control mechanism 500. In the disclosed exemplary embodiment, product indicia 580 is embossed into top surface 560 in three spaced locations. According to preferred embodiments of the present disclosure, to the extent product indicia 580 are presented on surfaces associated with fluid dispensation, e.g., top surface 560 or ball 506, such product indicia 580 is advantageously formed in/on the control mechanism in a recessed (as opposed to raised) manner, thereby minimizing the potential irritation and/or annoyance that might be encountered by an animal and/or individual who is accessing fluid therethrough.

It is contemplated that different color schemes and/or colorant materials may be advantageously employed in fabricating control mechanisms according to the present disclosure. Thus, it is contemplated that overcap 504 and cap member 502 may be fabricated from a transparent and/or translucent material, and that ball 506 may include a bright and/or fluorescent colorant to increase the visual novelty of the disclosed device. Alternative aesthetic combinations may be employed to enhance the market acceptance and/or market interest in the mechanisms of the present disclosure.

Of note, control mechanisms according to the present disclosure may advantageously include a backflow valve or mechanism to prevent and/or inhibit the flow of fluid back into the associated vessel, container and/or bottle, e.g., when the vessel, container or bottle is returned to an upright (or relatively upright) orientation. The backflow valve or mechanism may be advantageously mounted in the fluid flow path within lower cap member 502 and may be mounted with respect to lower cap member 502 such that the rotational motion of ball 506 is not impeded or otherwise inhibited, and further such that the mounting of control mechanism 500 with respect to a vessel, container and/or bottle is not negatively impacted. Thus, for example, a duck bill valve or other conventional backflow valve/mechanism may be mounted to lower cap member 502 so as to extend across the internal region of control mechanism 500 and prevent and/or inhibit the flow of fluids, as noted above.

A backflow valve/mechanism may be particularly advantageous where it is desired to prevent backflow of fluids into a container, vessel or bottle that may be used by a different individual or species. Thus, in circumstances where the disclosed control mechanism is utilized to permit an animal, e.g., a dog, cat, rodent or ferret, to access fluids from a vessel, container or bottle, the inclusion of a backflow valve/mechanism may be desirable to prevent/inhibit the backflow of fluids that contain saliva of such animal. Thus, fluid remaining in the vessel, container or bottle may be subsequently accessed by an individual, with a reduced potential for the presence of animal saliva or the like.

Inclusion of a backflow valve/mechanism may permit and/or facilitate the disclosed control mechanism to be employed in the delivery of supplements and/or medicines to an animal, e.g., by positioning the supplement/medicine in the region between the backflow valve/mechanism and the ball, and permitting the flow of fluids therethrough to deliver such supplement/medicine to the animal, while minimizing the further dilution and/or loss of such supplement/medicine within the attached vessel, container and/or bottle. The supplement/medicine may be in the form of a solid (e.g., pill or powder), liquid or slurry. Thus, the disclosed control mechanism may be pre-loaded with a desirable supplement and/or medicine for an animal (or human) and may be employed for administration of such supplement/medicine, as noted herein. Alternatively, a desirable supplement and/or medicine may be introduced to the disclosed control mechanism on an as-needed or as-desired basis by the control mechanism user.

It is further contemplated according to the present disclosure that structure(s) may be included as part of the disclosed control mechanism to assist in assuring the integrity of the fluids to be dispensed thereby, i.e., means for ensuring product integrity, particularly when the control mechanism is secured and/or mounted to a vessel, container or bottle containing such fluid. Thus, for example, the overcap and the lower cap member may be fabricated such that one or more strips of material extend therebetween, such strip(s) of material being broken when the overcap is first rotated relative to the lower cap member. The strip(s) of material may take the form of thin vertical strips that are formed during molding and/or as a post-molding operation, as will be apparent to persons skilled in the art. Similarly, means for ensuring product integrity may be provided between the disclosed control mechanism and the vessel to which it is mounted. Thus, one or more strips of material may extend between the control mechanism and the vessel, container or bottle to signal/indicate product integrity, such strip(s) being broken when (and if) the control mechanism is rotated relative to such vessel, container or bottle. In addition to friable material strips, the means for ensuring product integrity may take the form of an overwrap of plastic material (e.g., a plastic shrink-wrap) or other product packaging system that is designed to ensure product integrity, as are generally known in the art. In this way, a user can be assured that the fluid contained within the vessel, container or bottle has remained in a sealed/closed condition since initial packaging.

Although control mechanisms of the present disclosure, e.g., animal/pet drinking aids, have been described with reference to exemplary embodiments thereof, the present disclosure is not to be limited to the specifics of the disclosed embodiments, but is to be broadly understood. For example, it is contemplated that an eyelet and cover may be secured to certain embodiments of the cap of the present disclosure, e.g., through interaction with threads formed on the exterior of the cap, thereby permitting users to affirmatively close the open end of the cap (thereby potentially recessing the ball within the cap, e.g., against the bias of the compression spring or against a washer such as washer 106). It is further contemplated that for threaded embodiments of the disclosed control mechanisms and/or animal/pet drinking aids, it may be desirable to include a ridge, flange or stop on the cap at the end of the threads to provide a positive stop in connection with the screwing of the cap onto the bottle. The disclosed embodiments are merely illustrative, and not limitative, of the scope of the present invention, and changes, modifications and/or variations may be utilized without departing from the spirit or scope of the present invention.

What is claimed is:

1. A flow control device comprising:
  (a) a cap member configured and dimensioned for cooperation with a fluid container;
  (b) an overcap movably mounted with respect to said cap member, said overcap defining a central opening; and
  (c) a ball captured between said cap member and said overcap, said ball being sized to obstruct fluid passage through said central opening;
  wherein a variable flow clearance may be established by rotating said overcap relative to said cap member.

2. The flow control device according to claim 1, wherein at least one of said cap member and said overcap include indicia reflecting the size of said variable flow clearance based on the relative rotational position of said cap member and said overcap.

3. The flow control device according to claim 2, wherein said indicia are circumferentially spaced indicia on said cap member and said overcap.

4. The flow control device according to claim 3, wherein said circumferentially spaced indicia include a reference marker formed on said cap member and a series of positional markers formed on said overcap, and wherein the size of said variable flow clearance is reflected by alignment of said series of positional markers with said reference marker.

5. The flow control device according to claim 1, wherein said cap member and said overcap include a plurality of circumferentially spaced gripping ridges.

6. The flow control device according to claim 1, wherein said overcap defines a truncated cone shape that includes a beveled surface.

7. The flow control device according to claim 6, wherein said beveled surface includes a chamfered region adjacent said central opening.

8. The flow control device according to claim 6, wherein said cap member defines a substantially cylindrical shape that includes an inwardly directed conical flange.

9. The flow control device according to claim 8, wherein said ball is captured between said beveled surface and said inwardly directed conical flange.

10. The flow control device according to claim 1, wherein said cap member includes a cylindrical base portion and a cylindrical mating extension, and wherein a series of circumferentially spaced ridges are formed on the exterior of said mating extension.

11. The flow control device according to claim 10, wherein a stop is formed on the interior of said overcap, and wherein said stop is configured and dimensioned to contact said series of circumferentially spaced ridges as said overcap is rotated relative to said cap member.

12. The flow control device according to claim 11, wherein contact of said stop with said series of circumferentially spaced ridges provides a tactile sensation as said overcap is rotated relative to said cap member and inhibits relative movement of said overcap and said cap member when said flow control device is in use.

13. The flow control device according to claim 11, wherein a stop ridge is formed on said cap member, and wherein contact of said stop with said stop ridge prevents said overcap from becoming disengaged from said cap member.

14. The flow control device according to claim 1, wherein cooperative helical grooves are formed on said cap member and said overcap to facilitate rotational motion therebetween.

15. The flow control device according to claim 1, wherein said flow control device is adapted for use with a fluid, and wherein said ball is fabricated from a material having a specific gravity that is greater than the specific gravity of said fluid.

16. The flow control device according to claim 1, further comprising a container that is configured and dimensioned for receipt of a fluid, and wherein said cap member is mounted to said container.

17. The flow control device according to claim 16, wherein said container is a fluid-containing bottle and wherein said cap member is adapted to be screwed onto said fluid-containing bottle.

18. The flow control device according to claim 1, further comprising product indicia formed on at least one of said overcap and said cap member.

19. The flow control device according to claim 1, further comprising a backflow valve mounted to the interior of said cap member.

20. The flow control device according to claim 1, further comprising means for ensuring product integrity joined with respect to at least one of said overcap and said cap member.

21. The flow control device according to claim 1, further comprising (i) a fluid-containing container and (ii) means for ensuring product integrity for fluid contained within said fluid-containing container, said means for ensuring product integrity joined at least with respect to said cap member and said fluid-containing container.

22. The flow control device according to claim 21, wherein said means for ensuring product integrity further ensures integrity with respect to said cap member and said overcap.

23. The flow control device according to claim 22, wherein said means for ensuring product integrity includes an overwrap of plastic material.

24. The flow control device according to claim 1, further comprising a backflow valve positioned within said cap member.

25. The flow control device according to claim 24, wherein said cap member includes an inwardly directed flange which supports said ball, and further comprising a supplement or medicine positioned between said backflow valve and said inwardly directed flange.

26. A method for controlling fluid flow from a container, comprising:
   (a) providing a flow control device that includes a cap member, an overcap rotatably mounted with respect to said cap member, and a ball captured between said cap member and said overcap,
   (b) mounting said flow control device to a container that contains a fluid;
   (c) rotating said overcap relative to said cap member to create a clearance region for fluid passage around said ball; and
   (d) at least partially inverting said container with said flow control device mounted thereto, such that fluid may pass through said clearance region and be discharged from said flow control device.

27. The method of claim 26, wherein said fluid is discharged from said container in part based on rotation of said ball and in part based on axial movement of said ball relative to said overcap.

28. The method of claim 26, wherein said control of fluid flow is used in at least one of supplying fluid to a dog, supplying fluid to an animal other than a dog, applying fluid to a substrate, applying colorant to a substrate and applying adherent to a substrate.

29. The method of claim 26, further comprising providing a supplement or medicine within said flow control device, and delivering said supplement or medicine to a user of said flow control device by said at least partial inversion of said container.

* * * * *